UNITED STATES PATENT OFFICE.

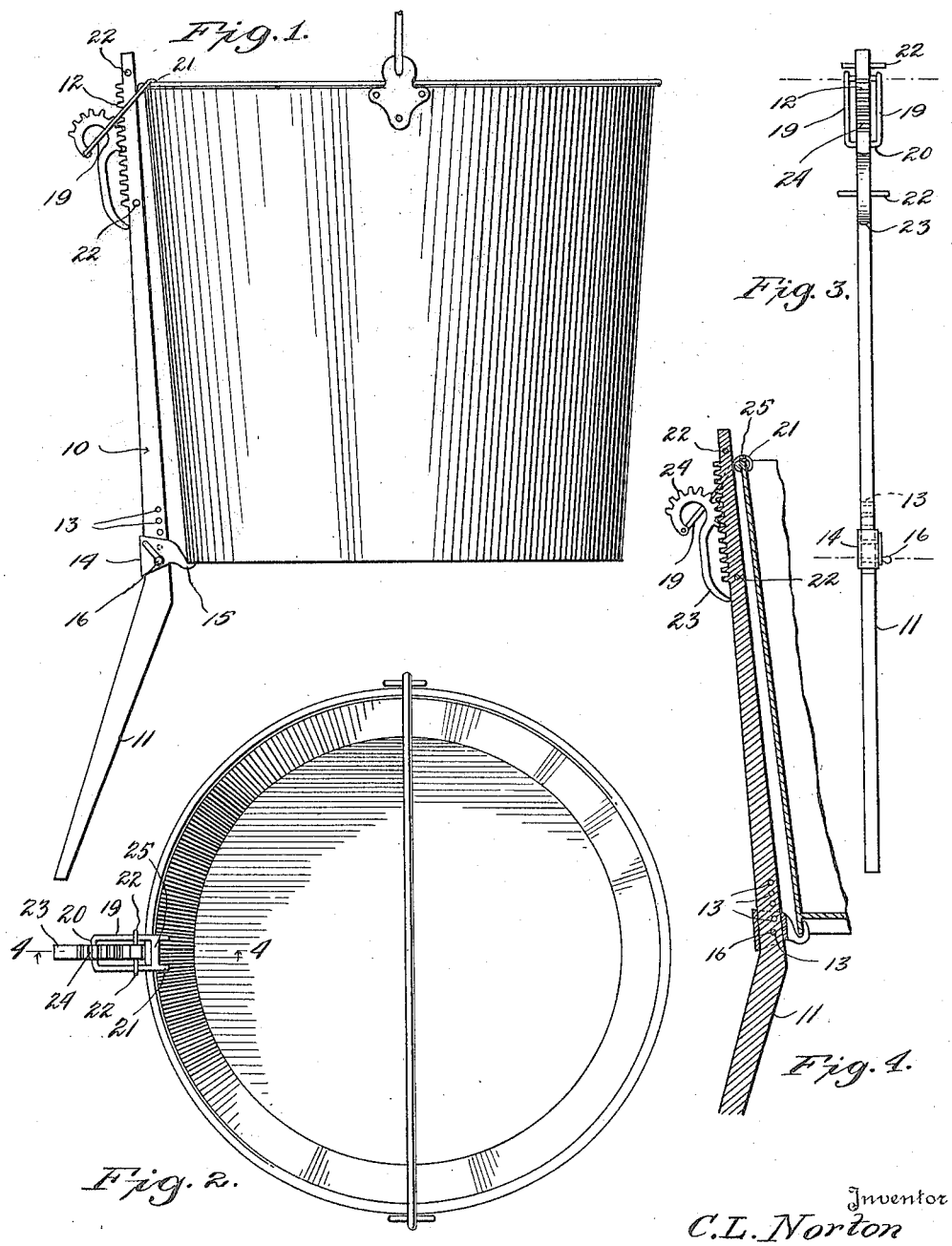

CLYDE L. NORTON, OF WAITSFIELD, VERMONT.

MILK-PAIL HOLDER.

1,180,668.  Specification of Letters Patent.  Patented Apr. 25, 1916.

Application filed July 13, 1915.  Serial No. 39,658.

*To all whom it may concern:*

Be it known that I, CLYDE L. NORTON, a citizen of the United States, residing at Waitsfield, in the county of Washington, State of Vermont, have invented certain new and useful Improvements in Milk-Pail Holders; and I do hereby declare the following to be a full, clear, and exact description of the invention, such as will enable others skilled in the art to which it appertains to make and use the same.

This invention relates to improvements in milk pail holders and has for its object to provide a simple, efficient and inexpensive article of the above character whereby a pail may be adjustably supported relatively to the ground and in position to receive the milk when drawn from the cow.

A further object of the invention resides in the provision of a holder for milk pails in which parts thereof are relatively adjustable whereby to accommodate same to pails of various heights.

With the above and other objects of similar nature in view, the invention consists in the construction, combination and arrangement of parts, set forth in and falling within the scope of the appended claim.

In the drawing: Figure 1 is a side elevation of the improved holder shown as supporting a milk pail in position for use. Fig. 2 is a top plan view thereof. Fig. 3 is a front view with the pail removed, and Fig. 4 is a sectional view taken on the line 4—4 of Fig. 2.

Referring now more particularly to the drawing the holder comprises an upright 10, terminating at its lower end in a supporting leg 11 adapted to rest upon the ground when the device is in use.

The upright 10 which is substantially rectangular in cross section is provided on an edge face adjacent its upper end with a vertically disposed rack 12, and is further provided intermediate its length with a plurality of transverse openings 13. Engaged upon the upright and adjustable longitudinally with respect thereto is a sleeve 14, with which is integrally formed an outwardly and upwardly directed hook 15, the latter being adapted to engage the bottom edge of a pail whereby to support the same relatively to the ground. To retain the sleeve 14 adjustably on the upright there is carried upon an outer face a spring held pin 16, the same passing through an aperture in the sleeve and being removably engaged in the openings 13 above described.

In securing the upper end of the pail to the upright, there is provided a substantially U-shaped clamping yoke including spaced arms 19 and a connecting bight portion 20, this yoke being loosely engaged upon the upright adjacent its rack 12 with the arms 19 straddling the same and terminating in downwardly directed hooks 21 adapted to engage over the rim of the pail. It will thus be observed the yoke is adjustable longitudinally of the upright and toward or away from the supporting hook whereby to accommodate the holder to pails of different heights, and is limited in such adjustment by means of outwardly projecting stop pins 22 arranged transversely of the upright.

For retaining the yoke in its various adjusted positions and in clamping relation with the pail rim, there is utilized a lever 23, which is pivotally connected to the bight 20 of the yoke and provided with a toothed cam face 24 adapted for interlocking engagement with the rack 12. It is thus apparent that downward swinging of the lever will move the yoke transversely of the upright with its hooked ends 21 engaging the pail and drawing same tightly against the latter.

What is claimed, is:—

A milk pail holder comprising an upright, an adjustable support arranged intermediate the upright for engaging the bottom of a pail, a rack formed adjacent the upper end of the upright, a yoke loosely embracing the latter and adjustable toward or away from the support, and a cam lever operatively connected to one end of the yoke and having teeth coöperating with said rack, the other end of the yoke being adapted to engage and clamp the rim of the pail.

In testimony whereof, I affix my signature, in the presence of two witnesses.

CLYDE L. NORTON.

Witnesses:
 FERD H. NEWCOMB,
 W. E. JONES.

Copies of this patent may be obtained for five cents each, by addressing the "Commissioner of Patents, Washington, D. C."